(12) United States Patent
Pávics et al.

(10) Patent No.: US 11,454,333 B2
(45) Date of Patent: Sep. 27, 2022

(54) VALVE CONTROLLED CARTRIDGE OPERATED BY A PUSHBUTTON FOR THE MIXING OF WATER AND/OR FOR DIRECTING WATER COMING FROM AN INLET TO ONE OR MORE OUTLETS

(71) Applicant: KEROX IPARI ÉS KERESKEDELMI KFT., Sóskút (HU)

(72) Inventors: Dániel Pávics, Gödöllö (HU); Tamás Magöcsi, Monorierdö (HU); György Bolgár, Budapest (HU)

(*) Notice: Subject to any disclaimer, the term of this patent is extended or adjusted under 35 U.S.C. 154(b) by 0 days.

(21) Appl. No.: 17/601,466

(22) PCT Filed: Sep. 10, 2019

(86) PCT No.: PCT/HU2019/050042
§ 371 (c)(1),
(2) Date: Oct. 5, 2021

(87) PCT Pub. No.: WO2020/229854
PCT Pub. Date: Nov. 19, 2020

(65) Prior Publication Data
US 2022/0146015 A1  May 12, 2022

(30) Foreign Application Priority Data

May 16, 2019 (HU) .................................. P1900162

(51) Int. Cl.
*F16K 31/60* (2006.01)
*F16K 11/078* (2006.01)
(Continued)

(52) U.S. Cl.
CPC ........ *F16K 31/605* (2013.01); *F16K 11/0787* (2013.01); *F16K 11/044* (2013.01); *F16K 11/074* (2013.01); *F16K 11/0782* (2013.01)

(58) Field of Classification Search
CPC .. F16K 11/0787; F16K 31/383; F16K 31/524; F16K 11/074; F16K 11/0782; F16K 11/044; F16K 31/605
See application file for complete search history.

(56) References Cited

U.S. PATENT DOCUMENTS 1,176,212 A * 3/1916 Fulton ................. F16K 11/0787
                                                    236/12.22
2,202,971 A * 6/1940 Vedoe ..................... F16K 21/10
                                                    137/636.4
(Continued)

FOREIGN PATENT DOCUMENTS

| EP | 0831260 | 3/1998 |
|---|---|---|
| FR | 3057934 | 4/2018 |
| FR | 3063327 | 8/2018 |

OTHER PUBLICATIONS

International Search Report dated Mar. 3, 2020, for PCT/HU2019/050042 filed Sep. 10, 2019, 2 pages.

*Primary Examiner* — Matthew W Jellett
*Assistant Examiner* — Christopher D Ballman (57) ABSTRACT

Valve controlled cartridge operated by a pushbutton for the mixing of water and/or for directing water coming from an inlet to one or more outlets. The valve is a flow controlled piston valve (10) with a valve piston (17) guided in the interior of the housing (13) for axial displacement, and where no mechanical connection exists between the control valve (30) and the valve piston.

8 Claims, 9 Drawing Sheets

(51) Int. Cl.
*F16K 11/074* (2006.01)
*F16K 11/044* (2006.01)

(56) References Cited

U.S. PATENT DOCUMENTS

| | | | | |
|---|---|---|---|---|
| 4,285,361 A * | 8/1981 | Lissau | F16K 11/085 | 251/44 |
| 4,471,939 A * | 9/1984 | Scragg | A01G 25/165 | 251/38 |
| 4,768,553 A * | 9/1988 | Marx | F16K 21/06 | 251/20 |
| 5,927,597 A * | 7/1999 | Bolgar | G05D 23/1353 | 236/12.2 |
| 6,279,831 B1 * | 8/2001 | Lorch | G05D 23/1353 | 236/12.13 |
| 6,454,175 B1 * | 9/2002 | Lorch | G05D 23/1353 | 236/12.2 |
| 6,557,770 B2 * | 5/2003 | Mace | G05D 23/1353 | 236/100 |
| 6,631,735 B2 * | 10/2003 | Gloor | F16K 39/022 | 137/801 |
| 6,708,772 B2 * | 3/2004 | Bermes | F16K 31/383 | 169/22 |
| 7,017,605 B2 * | 3/2006 | Stroud | F16K 17/105 | 251/360 |
| 7,163,157 B2 * | 1/2007 | Goncze | G05D 23/1346 | 236/12.21 |
| 7,357,151 B2 * | 4/2008 | Lonnes | F16K 31/363 | 251/282 |
| 7,611,068 B2 * | 11/2009 | Iwai | F16K 19/006 | 137/457 |
| 7,673,808 B2 * | 3/2010 | Mace | G05D 23/1353 | 236/100 |
| 7,770,808 B2 * | 8/2010 | Ruga | G05D 23/1353 | 236/100 |
| 7,850,088 B2 * | 12/2010 | Wei | G05D 23/136 | 236/12.1 |
| 7,905,424 B2 * | 3/2011 | Li | F16K 11/0743 | 236/12.2 |
| 8,074,893 B2 * | 12/2011 | Mace | G05D 23/1353 | 236/12.11 |
| 8,505,583 B2 * | 8/2013 | Yie | F16K 31/363 | 137/830 |
| 8,740,097 B2 * | 6/2014 | Platet | G05D 23/1353 | 236/12.11 |
| 9,821,279 B2 * | 11/2017 | Pasquier | B01F 35/7131 | |
| 10,458,567 B2 * | 10/2019 | Buchmueller | F16K 31/1221 | |
| 10,775,813 B2 * | 9/2020 | Nobili | G05D 23/1313 | |
| 11,105,438 B2 * | 8/2021 | Toyoda | F16K 47/02 | |
| 2009/0146090 A1 * | 6/2009 | Hashimoto | F16K 31/52408 | 251/25 |
| 2014/0261744 A1 * | 9/2014 | Sansum | G05D 23/1353 | 137/15.18 |
| 2019/0101224 A1 * | 4/2019 | Shah | F16K 31/06 | |

\* cited by examiner

VALVE CONTROLLED CARTRIDGE OPERATED BY A PUSHBUTTON FOR THE MIXING OF WATER AND/OR FOR DIRECTING WATER COMING FROM AN INLET TO ONE OR MORE OUTLETS

CROSS-REFERENCE TO RELATED APPLICATIONS

The present invention is a national stage entry of international application no. PCT/HU2019/050042, filed on Sep. 10, 2019, which claims priority to Hungarian patent application no. P1900162, filed on May 16, 2019.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The invention relates to a cartridge controlled by a valve operated by a pushbutton for the mixing of water and/or for directing water coming from an inlet to one or more outlets, which comprises a valve closing and opening the fluid flow between at least one inlet and outlet, in which a control valve is operated by a double position mechanism. The control valve can be set into open and closed positions by the subsequent pressings of a pushbutton, wherein the control valve, the valve and the double position mechanism constitute a common mechanical unit all having a common axis, and the double position mechanism, the control valve and the valve are arranged along the axis after one another in a housing. The housing is surrounded in a sealed way by a case in which the housing can be turned around the axis within a predetermined angular range. In the interior of the case, under the lower end of the housing, a ceramic stationary disc is arranged, and directly above the ceramic stationary disc with a common contacting plane a ceramic moving disc is arranged which can be turned together with the housing. The inlet or inlets and outlet or outlets are arranged at the bottom of the case and they are leading to the ceramic stationary disc.

In sanitary applications, primarily in different bathroom taps, in apportion of cartridges used in fixtures or shower taps for the opening and closing the flow of water, for the adjustment of the water temperature or for the selection of the water outflow locations preferred are the types that are handled by a pushbutton for opening and closing the flow of water. In such cases in addition to the operation of the pushbutton the turning of the tap or the pushbutton therein provides possibility for performing further handling functions. The realization of a control by a pushbutton requires in itself a serious challenge because a comfortable operation should be provided that requires only a small handling force, whereas the opening and closing of the water flow should take place with appropriate speed profile, reliability and possibly by avoiding the generation of transient flow.

A state of the art pushbutton control is provided by the cartridge available under the commercial product name "Talis Select S100", manufactured by the German company, Hansgrohe. In that cartridge, the pushbutton assembly enables pressing a sleeve provided with special inclined crown-like claws such as used widely in ball point pens, which gets turned by a predetermined angle under the effect of being pressed, wherein a further lower sleeve under the effect of being subsequently pressed takes in an alternating way one of two stable positions, of which one has a lower and the other one a higher axial height. Here, a magnetic valve takes a higher and a lower position and opens or closes a membrane valve, respectively. In the cartridge, the mechanism using the pushbutton, the control valve and the membrane valve have a common mechanically interconnected housing which can be turned by means of a grooved sleeve pulled around the pushbutton, wherein the sleeve is surrounded by and coupled to a cylindrical knob arranged in the fixture. In a space under the valve in a case that receives the aforementioned assembly, a ceramic stationary disc is provided which cannot be turned, and above the stationary disc a ceramic moving disc is arranged that can be moved concentrically around the axis.

This solution does not allow that such a cartridge can be used only by replacing the ceramic disc for adjusting the flow rate, or allow the user to choose through which of two outlets (tub or shower) the mixed water should flow.

A further drawback of that solution lies in that the opening and the closing of the water flow is not sufficiently definite and its flow transients do not have the required profile or delay.

It should be noted that, for the control of the opening and closing of the water flow by a pushbutton, a number of solutions have been suggested, of which the DE 10 2009 008 194 publication can be mentioned. That publication teaches the aforementioned opening and closing, and also teaches the flow rate to direct the flow through an inlet towards a plurality of outlets. In this solution, the pushing of a pushbutton controls the angular displacement of a ceramic body in small steps, and openings provided in the ceramic body that will take different positions with respect to other openings made in another ceramic body placed under or above the previous body, and, depending from the mutual arrangement of these openings, the fluid flow will be opened or closed or diverted to different directions.

A further solution that provides opening and closing the fluid flow or diverting the flow to different directions by means of turning ceramic discs can be learned from DE 101 37611, in which the turning takes place in a rather similar way as in case of ball point pens, wherein the stepwise turning of a profiled member results in the stepwise raising or sinking movement of the ball point head.

A further two-state mixing cartridge is known from DE 20 2017 106 212 U1, in which the repeated operation of a pushbutton at one end causes a control valve to open or close, and the internal pressures of a membrane valve under the control valve opens and closes the membrane valve. The cartridge has a vertical axis of symmetry and the outflow ducts and openings are arranged along the axis in a symmetric way. The flow control occurs in such a way that the cold and warm water inlets are fed to a mixing space above the membrane valve. Owing to a symmetric design, such a cartridge can be used either for mixing two inlets or as a switch between inlet and outlet passages, and the functions are determined by the structural design.

BRIEF SUMMARY OF THE INVENTION

The task of the invention is to provide a cartridge which can ensure the opening and closing of the fluid flow under optimum conditions and which enables the realization of multiple control functions by using basically the same cartridge design only by the replacement of the ceramic discs and the appropriate association of the inlet(s) and outlet(s) to openings made in the discs. For solving the task, a valve controlled cartridge has been provided. The valve controlled cartridge is operated by a pushbutton for the mixing of water and/or for directing water coming from an inlet to one or more outlets, which comprises a valve closing and opening the fluid flow between at least one inlet and outlet, in which a control valve is arranged operated by a double position mechanism by which the control valve can be set into open and closed positions by the subsequent pressings of a pushbutton, wherein the control valve, the valve and the double position mechanism constitute a common mechanical unit all having a common axis, and the double position mechanism, the control valve and the valve are arranged along the axis after one another in a housing, and the housing is surrounded in a sealed way by a case in which the housing can be turned around the axis within a predetermined angular range, and in the interior of the case under the lower end of the housing a ceramic stationary disc is arranged, and directly above the ceramic stationary disc with a common contacting plane a ceramic moving disc is arranged which can be turned together with the housing, and said inlet or inlets and outlet or outlets are arranged at the bottom of the case and they are leading to the ceramic stationary disc. Such a structural design has been developed according to the invention so that said valve is a flow controlled piston valve having a valve piston with a cylindrical upper portion guided in the interior of the housing for axial displacement, and having two opposite faces reaching the interior of the housing, and a shunt flow path with small cross section is provided through said upper portion of said valve piston along its periphery, and the bottom of the piston valve comprises a valve seat belonging to the housing, wherein no mechanical connection exists between the control valve and the valve piston, and the inlet or inlets are lead through inlet openings of the ceramic stationary disc and the ceramic moving disc and through a lateral passage of the housing to the bottom of said cylindrical upper portion of said valve piston, and an intermediate space is arranged in the closed state of the valve piston between the top of the valve piston and the bottom of the control valve, and an interior space of the housing located under the valve seat of the valve piston is separated from said lateral passage), and said interior space communicating through outlet opening(s) of said ceramic moving and stationary discs to an outlet space leading to said outlet(s), and the outlet space is connected through a further passage with an upper space defined above the control valve and under said double position mechanism, and both said inlet and outlet openings provided in the ceramic stationary and moving discs are arranged asymmetrically relative to the axis.

For preventing turning of the ceramic stationary disc, it is preferred if the ceramic stationary disc comprises cuts, and the case has respective ribs at positions corresponding the said cuts which are inserted into said cuts.

For moving the ceramic moving disc, the ceramic moving disc has a circular shape and has a surface facing the housing in which bores are arranged away from the axis and from each other, and from the bottom of the housing at positions that correspond to said bores pins extend out and being inserted into said bores, whereby the ceramic moving disc follows the turning of the housing around the axis.

In a cartridge for mixing cold and warm water in a half of the ceramic stationary disc, separated by a diagonal when seen from the bottom of the cartridge, two openings are provided to be used for inlets, and the shape of these openings change in the interior of the ceramic stationary disc and their shape in said contacting plane corresponds to two spaced circular sectors defined by a pair of circular arc sections, and the ceramic moving disc comprises in said common plane a pair of openings having the shape of circular arc sections and separated by a smaller spacing and covering respective narrower angular ranges than said two openings in the stationary disc, wherein the respective openings that have the shape of circular sectors are associated with the inlet of cold, respectively warm water, and in the ceramic stationary disc in the half circular area positioned opposite to the openings a further opening is provided that has a bottom surface with substantially rectangular shape with rounded ends which expands along inclined walls in the body of the ceramic stationary disc towards the common plane, and in said plane the opening has a shape that surrounds the axis and its sides diverge in radial direction to form substantially a triangle with rounded ends, and opposite to this opening in the ceramic moving disc a rectangular opening is provided with rounded ends and which surrounds the axis and extends in radial outward direction and communicates with said outlet space, and the bottom of said opening of the ceramic stationary disc communicates with said water outlet.

In a preferred embodiment, in the ceramic moving disc, one of the openings have the shape of a circular sector and the associated inlet is closed, and to the inlet opposite to the other opening a mixed water with the required temperature is lead, and by the turning of the housing the flow rate of water can be adjusted.

In case of a cartridge capable of mixing cold and warm water, one opening of the ceramic moving disc in said plane proceeds within the body of the ceramic moving disc in an inclined path towards the other opening and gets united therewith before reaching its upper plane, whereby, in addition to changing the mixing ratio of the cold and warm water, also the flow rate of water passed through the opening with inclined passage can be adjusted.

In case of a cartridge capable of performing diverting function, in the opposite side of the ceramic stationary disc relative to said common plane, an opening is provided in radial direction away from the axis which occupies a wide angular arc sector, and the opening gets narrower in the body of the ceramic stationary disc and leads to the axial extension line of said inlet passage, the ceramic moving disc has an opening in said common plane that has a shape which starts from the central part and opens as a widening arc section in radial direction away from the center, which partially covers said opening of the ceramic stationary disc within the turning range of the ceramic moving disc. The ceramic stationary disc comprises at the side opposite to said opening further angularly spaced openings which lie away from the axis in the same extent, and respective outlets are connected to the opposite ends of these openings. In the ceramic moving disc in opposite position to said wide opening in said common plane a rectangular, a rounded opening is provided and this opening extends from the center in radial direction, and, within the body of the moving disc, the opening proceeds in the form of an inclined passage to the outlet space of the flow controlled piston valve, and during turning of the ceramic moving disc the water passed to the inlet will alternatively and separately flow to the respective outlets.

In an embodiment for performing open diverting function, in the opposite side of the ceramic stationary disc relative to said common plane, an opening is provided in radial direction away from the axis which occupies a wide angular arc sector, and this opening gets narrower in the body of the ceramic stationary disc and leads to the axial extension line of said inlet passage. The ceramic moving disc has an opening in said common plane that has a shape which starts from the central part and opens as a widening arc section in radial direction away from the center which partially covers said wide opening of the ceramic stationary disc within the turning range of the ceramic moving disc, and the ceramic stationary disc comprises at the side opposite to said wide opening further angularly spaced openings which lie away from the axis in the same extent, and respective outlets are connected to the opposite ends of these spaced openings, and in the ceramic moving disc in opposite position to said wide opening in said common plane an opening is provided and this opening starts from the center and extends outwardly in radial direction and its shape is first wide then narrowing until about the half radial length then widens again in outward direction and being rounded at both ends, and the opening proceeds to communicate with the outlet space of the flow controlled piston valve, and, during turning of the ceramic moving disc, the water is passed to the inlet will alternatively flow to the respective outlets and in the central angular range to both of said outlets.

The cartridge according to the invention solves the task set and the flow controlled piston valve operates in a reliable way and with adjustable speed and in certain cases with adjustable delay which is independent from how the push-button has been pushed. Furthermore, by the replacement of the ceramic discs, substantially the same cartridge design can be used for many functions.

BRIEF DESCRIPTION OF THE SEVERAL VIEWS OF THE DRAWINGS

The cartridge according to the invention will now be described in connection with preferred embodiments thereof, wherein reference will be made to the accompanying drawings. In the drawing.

DETAILED DESCRIPTION OF THE INVENTION

Figure 1:
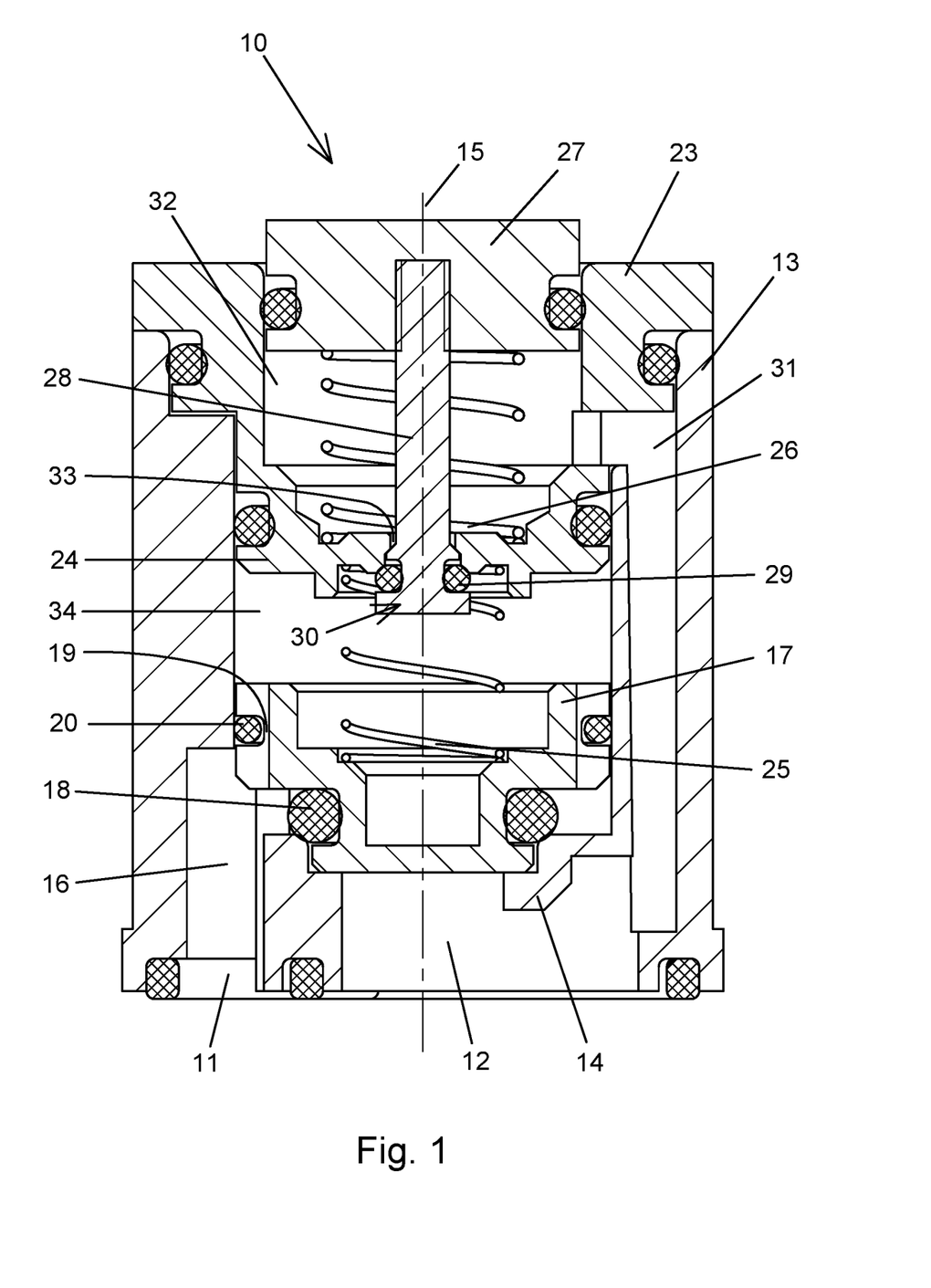
FIG. 1 shows the sectional elevation view of the piston valve used for the invention in the closed position thereof.

FIG. 1 shows the sectional elevation view of a piston valve 10 used for the cartridge according to the invention. The piston valve 10 has inlet 11 and outlet 12. The inlet 11 is connected by means of a connection not shown in the drawing e.g. to a source of mixed water being under pressure, wherein the temperature of the mixed water is determined by the flow rates of the constituting cold and hot water. The outlet 12 can be connected, for example, to a shower head also not shown in the drawing, which is under normal atmospheric pressure. FIG. 1 shows the piston valve 10 in closed state when there is no fluid passage between the inlet 11 and the outlet 12.

The piston valve 10 has a housing 13 that has a cylindrical hollow body with a valve seat 14 at its lower portion constituted by an asymmetrically designed separation member extending normal to longitudinal axis 15 of the housing 13, and the separation member has a central opening that communicates with the outlet 12. In the interior of the housing 13, at the left side in the view of FIG. 1, a vertical passage 16 is provided which ends above the valve seat 14 and communicates with the inlet 11.

Figure 5A:
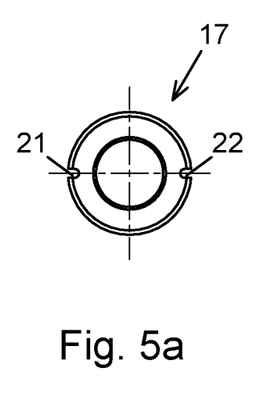
FIGS. 5a, 5b and 5c show the top view, side view and bottom view of the valve piston 17, respectively.
Figure 5B:
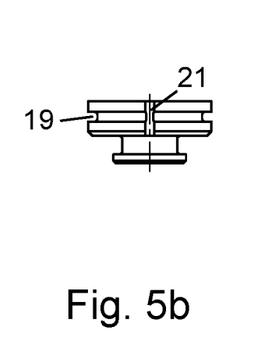
Figure 5C:
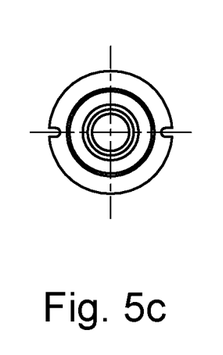

In the interior cavity of the housing 13 in the space above the valve seat 14, a partially closed valve piston 17 is arranged that has a bottom part formed as a cylindrical duct on which a groove is provided for receiving a sealing ring 18. The valve piston 17 has a wider cylindrical upper body portion, on which an outwardly open groove 19 is provided, in which an O-ring 20 is inserted with a diameter smaller than the size of the groove 19, whereby the valve piston 17 does not provide a sealed separation between the spaces under and above the upper body. It is noted that the design of the valve piston 17 is illustrated in detail in FIGS. 5a, 5b and 5c, in which it can be observed that, in addition to the imperfectly closing ring 20, a pair of axial cuts 21, 22 are provided in the outer mantle of the valve piston 17 that constitute respective passages with small cross section that act as shunt branches between the two end surfaces of the upper body of the valve piston 17. In connection with the valve piston 17, the attribute "partially closed" designates that the two spaces separated thereby are not hermetically closed from each other and there is a predetermined degree of fluid passage between them.

Reference is made again to FIG. 1, wherein can be seen that a closing body 23 is attached to the upper side of the housing 13 that has an outer diameter substantially equal to the diameter of the housing 13, and the closing body 23 is designed symmetrically to the longitudinal axis 15 and extends into the inner cavity of the housing 13 following a stepwise narrowing section. The closing body 23 also has a hollow interior with a lower end 24 that hosts respective sunken nests both under and above the lower end 24. The upper end of a spring 25 is inserted into the lower nest to provide a bias to the valve piston 17. The lower end of a spring 26 is arranged in the upper nest to provide a bias for a pushbutton 27. The pushbutton 27 is inserted into the central opening of the closing body 23 and it is guided for axial displacement along the longitudinal axis 15. In the central lower portion of the pushbutton 27, a preferably threaded shaft 28 is fixed. The lower end of the shaft 28 is slightly wider and has an outwardly open circular groove into which a sealing ring 29 is arranged. At the lower end 24 of the closing body 23, a recess is formed with conical lower outer surface. The shaft 28, together with the sealing ring 29, constitutes a control valve 30 and its axial displacement is enabled by the sealed guiding of the pushbutton 27 in the inner bore of the housing 13.

The spring 26 is arranged between the inner surface of the pushbutton 27 and the central part of the upper surface of the lower end 24 of the closing body 23 and presses the pushbutton 27 in upward direction i.e. outward of the housing 13.

The biasing spring 25 is arranged between the lower recess of the lower end 24 and the valve piston 17 and presses the valve piston 17 in lower direction towards the valve seat 14. The lower end of the spring 25 is kept by a nest formed in the upper face of the valve piston 17. The nest is surrounded by a cylindrical ring which has an upper face that forms the upper face of the valve piston 17.

In the wall of the housing 13 shown at the right side of FIG. 1 of the drawing, a vertical passage 31 is provided and its lower end communicates with the inner cavity of the housing 13 under the valve seat 14, and, in this way with the outlet 12 and its upper end, communicates with an upper space 32 defined between the lower surface of the pushbutton 27 and the lower end 24 of the closing body 23. The diameter of the shaft 28 is slightly smaller than an axial bore 33 provided in the central part of the lower end 24 of the closing body 23. Therefore, in the pushed state of the pushbutton 27, the aforementioned upper space 32 communicates with an intermediate space 34 formed between the lower end 24 of the closing body 23 and the valve piston 17.

The operation of the piston valve used in the cartridge according to the invention is as follows.

In the position shown in FIG. 1, the valve piston 17 is pressed by the biasing spring 25 to the valve seat 14, and the valve is sealed by the sealing ring 18. The pressure in the intermediate space 34 is the same pressure what is present at the inlet 11 which is higher than the atmospheric one. In the upper space 32 there is only atmospheric pressure because now the control valve 30 is in closed state (the pushbutton 27 is in its upper position), i.e. the pressures in the intermediate space 34 differs from that prevailing in the upper space 32. The atmospheric pressure in the upper space 32 is caused through the passage 31, because, at the lower end thereof, the communication with the outlet 12 ensures this atmospheric pressure. In this position, the overpressure prevailing in the intermediate space 34 acts on the lowermost surface of the shaft 28, whereby this pressure is higher than the bias provided on the control valve 30 by the spring 26, and the control valve 30 is pressed to its own valve seat and remains closed. The same overpressure also acts on the upper end of the valve piston 17 and, in addition to the pressure provided by the spring 25, presses the same to its own valve seat 14.

Figure 2:
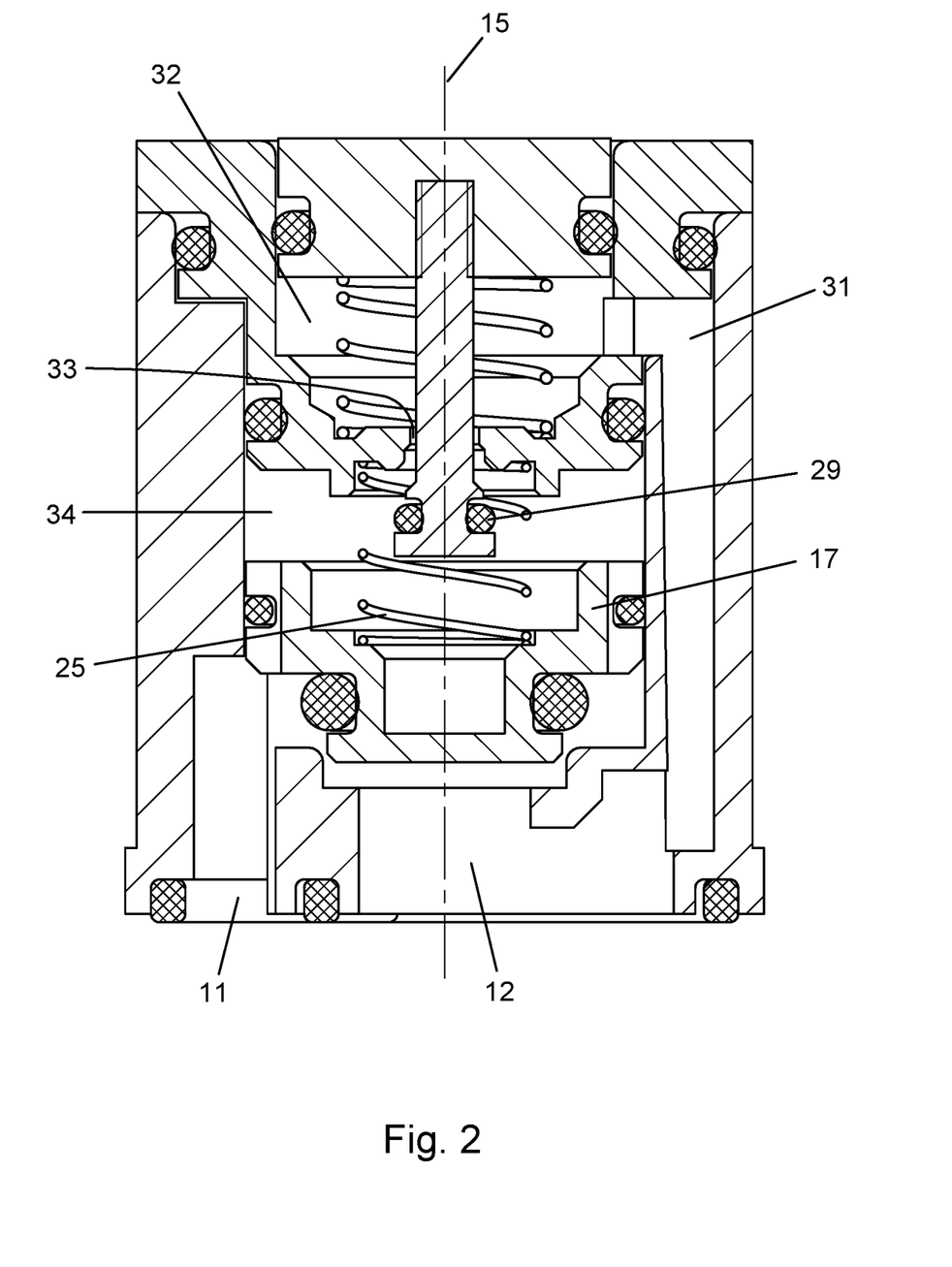
FIG. 2 is a sectional elevation view similar to FIG. 1 that shows the valve in the initial phase of its opening.

Reference is made now to FIG. 2, in which the pushbutton 27 is shown in pressed position, i.e. its upper end falls in the upper plane of the closing body 23 and the control valve 30 is in open state because the sealing ring 29 is moved away from its valve seat with inclined surface. When the control valve 30 is opened, a fluid passage opens between the intermediate space 34 and the upper space 32 through the axial bore 33 and, owing to the fact that in the upper space 32 there is only a low (atmospheric) pressure, the fluid with overpressure will flow through the open bore 33 in the upper space 32, and the pressure in the intermediate space 34 will decrease. The pressure difference between the lower and upper surfaces of the valve piston 17 will push and move the valve piston 17 in upward direction along the longitudinal axis 15 against the biasing force of the spring 25, whereby under the valve piston 17 a passage will open for the mixed water towards the outlet 12, and that pressure will present itself through the passage 31 also in the upper space 32.

Figure 3:
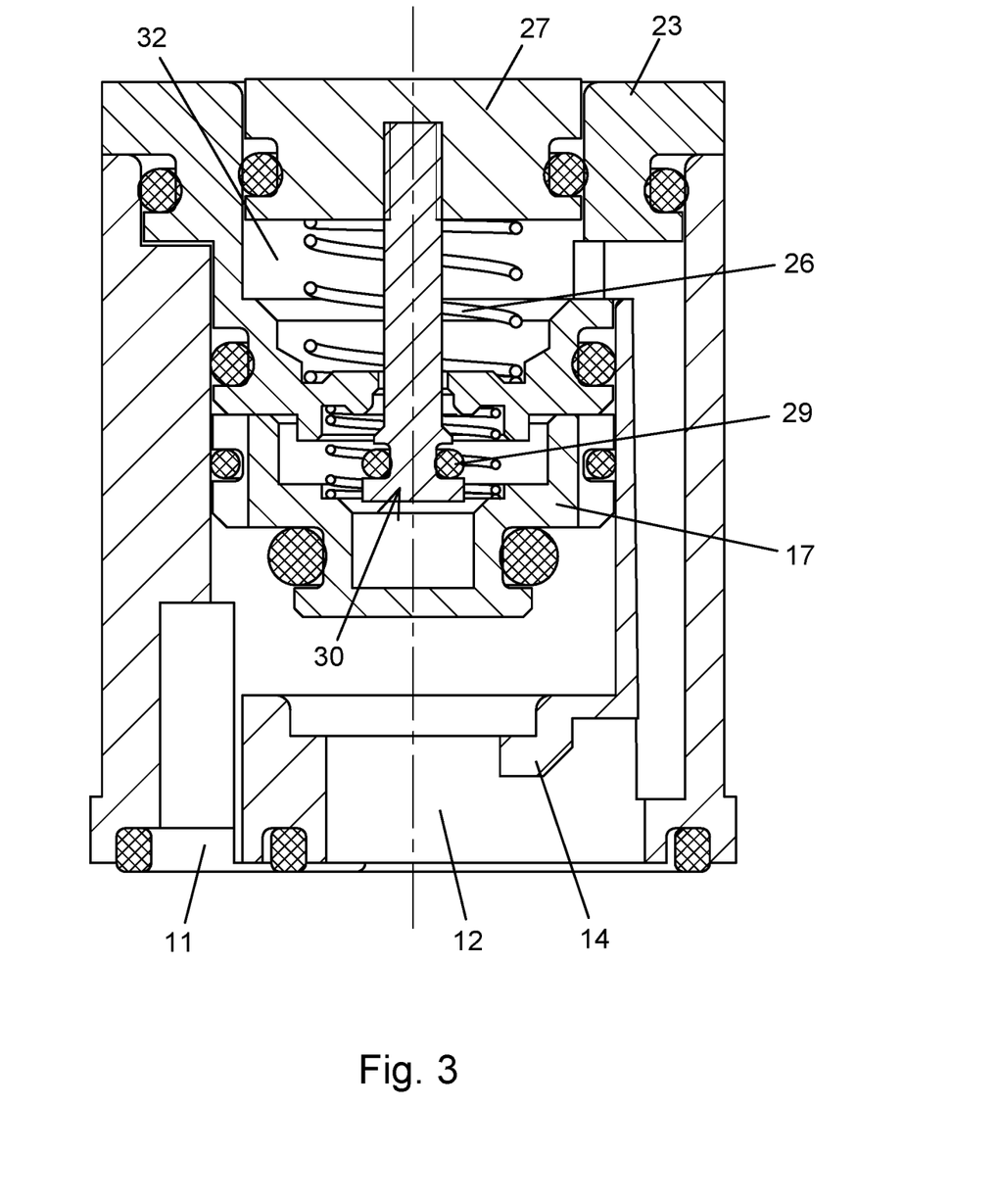
FIG. 3 is a sectional elevation view similar to FIG. 1 that shows the valve in the open state of the valve.

As a consequence of the described pressure distribution the valve piston 17 will move in upward direction till its abutment, which state is shown in FIG. 3. The upper face of the valve piston 17 (which is formed by the previously mentioned ring) abuts the lower surface of the lower end 24 of the closing body 23 and the volume of the intermediate space 34 decreases to minimum. The shunt path between the lower and upper faces of the valve piston 17 gets substantially decreased. The pressure of the fluid flowing from the inlet 11 presses the valve piston 17 in upper direction against the biasing force of the spring 25 and a free flow path is provided between the inlet 11 and the outlet 12. The pressure in the upper space 32 corresponds substantially to that at the outlet 12. The pressure difference between the two opposite faces of the valve piston 17 keeps it in the open position shown in FIG. 3.

This free flow path can be closed by the lifting of the pushbutton 27. Then the control valve 30 takes the closed position shown in FIG. 4. By the closure of the control valve 30, the flow path between the upper space 32 and the intermediate space 34 (decreased to minimum) above the valve piston 17 gets broken. The increased pressure under the valve piston 17 forces the fluid to flow into the intermediate space 34, whereby the pressure difference between the upper and lower faces of the valve piston 17 decreases to zero and the biasing force of the spring 25 pushes the valve piston 17 in downward direction until it reaches the position shown in FIG. 1. Then the fluid path gets broken between the inlet 11 and the outlet 12 and the valve piston 17 closes. In the upper space 32, again, the atmospheric pressure will prevail through the passage 31.

Figure 4:
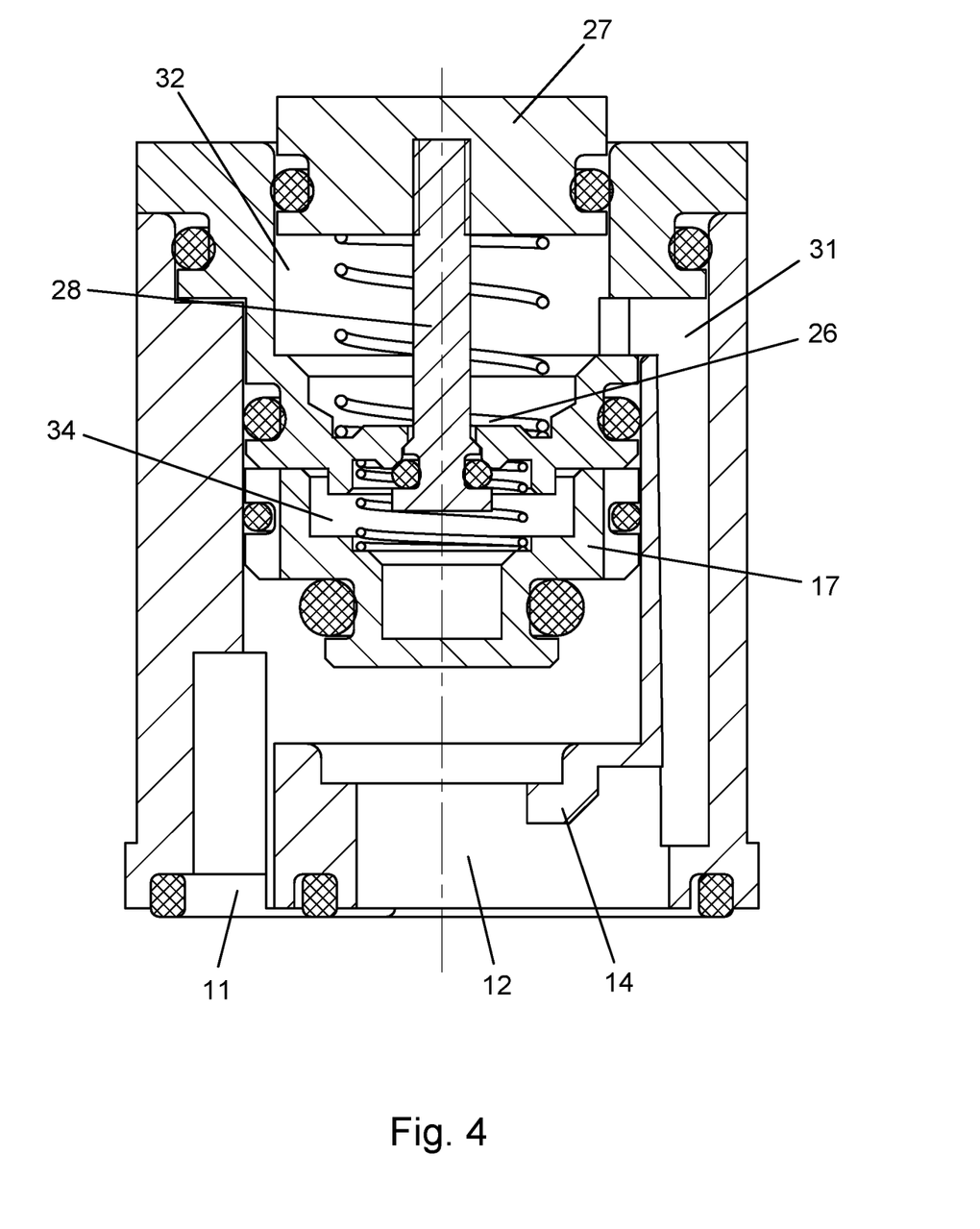
FIG. 4 is a sectional elevation view similar to FIG. 1 that shows the valve in the initial phase of closing the valve.

At this design, if the pressure at the inlet 11 disappears due to any reason, the spring 25 will push the valve piston 17 into the lowermost position at which the valve gets closed, and the spring 26 will similarly close the control valve 30.

In this way, if in the water supply system any problem takes place and the overpressure disappears, the fully closed state will be automatically taken, and when the pressure returns, flow can commence only after the pushbutton 27 has been intentionally pushed again.

A characteristic property of the described piston valve 10 lies in that there is no kind of direct mechanical connection between the pushbutton 27 with the valve piston 17 which opens and closes the main flow path, because the valve piston 17 is moved exclusively by the flow and pressure distribution pattern provided together with the effects of the biasing springs 25 and 26. The speed of the opening and closing transient processes can be controlled in a fine way by the design of the shunt passages i.e. the decreased outer sealing of the valve piston 17 and the size of the cuts 21, 22 and the cross section and length of the passage 31.

A specialty of this solution lies in that the cross section of the flow path between the two opposite faces of the upper body of the valve piston 17 is determined first by the cross section of the cut 21, 22 and the play between the groove 19 and the ring 20. If the cross section of these passages is changed, i.e. decreased, then fluid can flow only slower between the two opposite faces and the previously mentioned pressure equalization requires a longer time, which causes delay in the closing and opening of the valve. There can be a field of application in which the start of water flow is delayed after the pushbutton 27 has been pressed. The extent of the delay can be finely adjusted by the change of the aforementioned cross sections of the shunt paths.

The piston valve 10 described so far will be referred to in the following as flow controlled piston valve, and the opening and closing the fluid flow in the cartridge according to the invention will be provided with such a valve.

Figure 6:
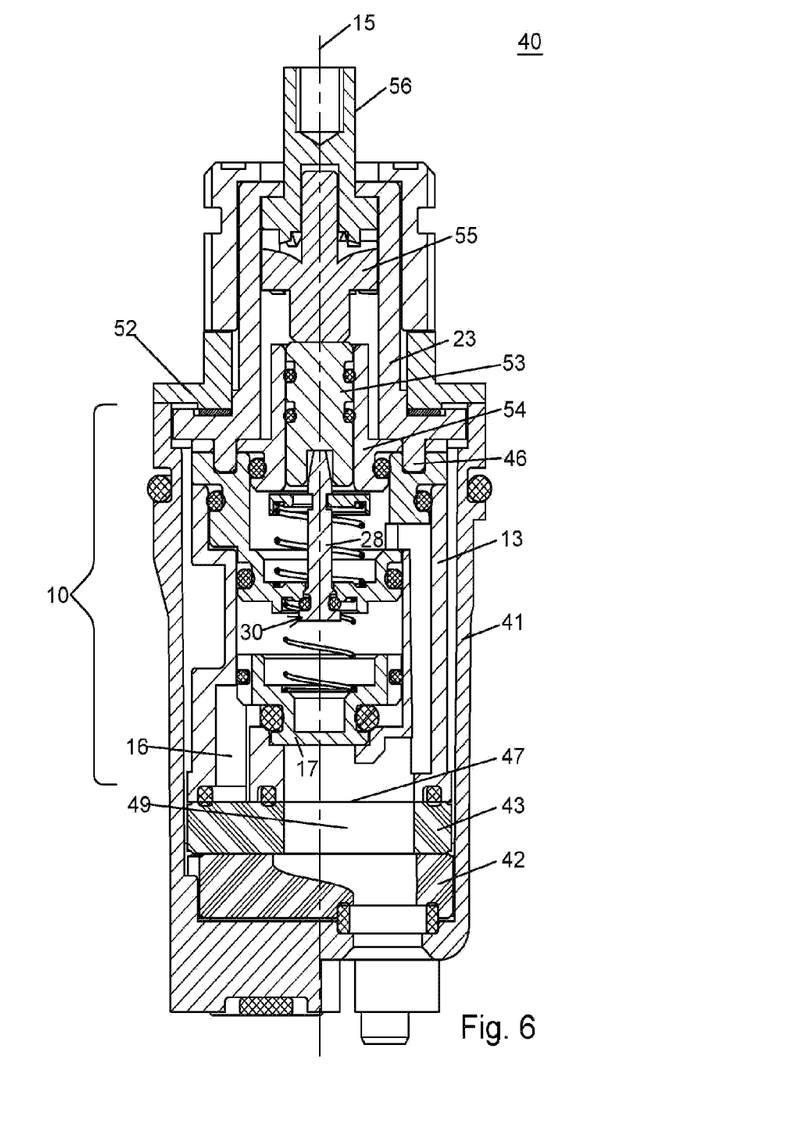
FIG. 6 is the sectional elevation view of an embodiment of the cartridge according to the invention.

Reference is made now to FIG. 6 that shows the elevation sectional view of a first embodiment of the cartridge 40 according to the invention. The inner portion of the cartridge 40, indicated in FIG. 6 by a large bracket, is identical with the previously described flow controlled piston valve 10, and differences can be found only in the size of certain parts and their relative sizes. In FIG. 6, certain reference numerals visible in FIG. 1 were also indicated. The housing 13 of the flow controlled valve piston 10 is encircled by case 41, which is stationary and provided at its bottom end with sealed connection ducts as it is customary in case of cartridges with predetermined applications (i.e. one or more outlets and one or more inlets). The case 41 has a hollow interior and its bottom part holds a stationary ceramic disc 42 arranged concentrically with the axis 15 and cannot be turned or moved. Above the stationary ceramic disc 42, a moving ceramic disc 43 is arranged which can be turned around the axis 15 within a predetermined angular range and can be moved by the housing 13 connected with it.

The cartridge 40 can perform different functions depending on the design of the stationary ceramic disc 42, of the moving ceramic disc 43 and of the space provided above them. Before describing such functions, certain parts of the cartridge 40 connected with the flow controlled piston valve 10 will first be introduced because these parts are more or less the same in the different embodiments of the cartridge 40 that perform different functions.

Figure 7:
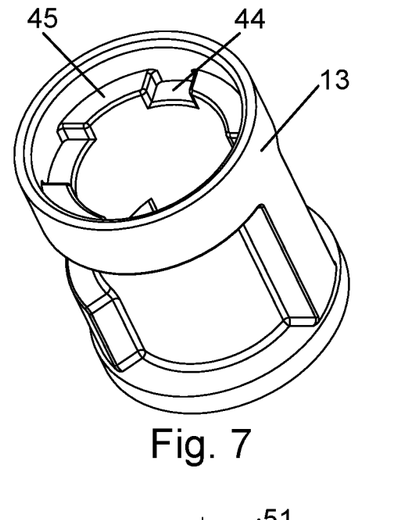
FIG. 7 is the perspective view of the housing 13 projected obliquely from above.
Figure 8:
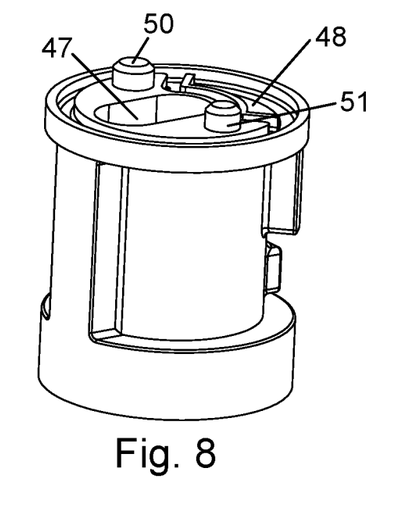
FIG. 8 is the perspective view of the housing 13 projected obliquely from the front and below.
Figure 9:
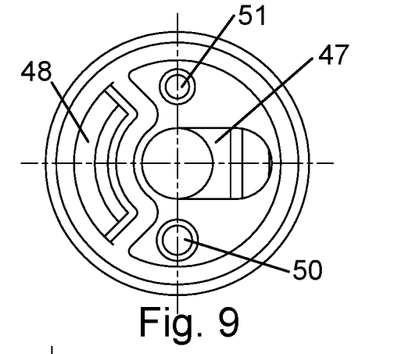
FIG. 9 is the bottom view of the housing 13.

FIGS. 7 and 8 are perspective views of the housing 13 projected from different directions, wherein FIG. 7 shows the housing 13 from above and FIG. 8 from below and FIG. 9 shows the bottom view of the housing 13. In FIG. 7, it can be seen that the housing 13 has an upper rim 45 in which a few recesses 44 are made in which protrusions 46 (visible in FIG. 6) of the closing body 23 are fitted to ensure that the turning of the closing body 23 forces the housing 13 to make the same turn. In the cartridge 40, the closing body 23 takes the role of the casing of the pushbutton. FIGS. 8 and 9 show the housing viewed from below and it can be observed that at the bottom the housing 13 has a large, elongated and rounded opening 47 and a separate, sector-shaped opening 48 with a radius further away from the axis 15. In the embodiment shown in FIG. 6, the opening 47 has inclined, upwardly proceeding walls and leads to a central space under the valve piston 17 which is associated with the outlet 12 in the illustration of FIG. 1. This central space is shown in FIG. 6 as outlet space 49. The lower end of the sector shaped opening 48 abuts the upper surface of the moving ceramic disc 43 fitted to the bottom of the housing 13, and it communicates with the passage 16, shown also in FIG. 1, that constitutes the inlet side of the flow controlled piston valve 10. In FIGS. 8 and 9, a pair of short pins 50, 51 can be seen that project out of the bottom of the housing that are fitted into respective bores made in the moving ceramic disc 43, whereby the turning of the housing 13 will be followed by the turning of the moving ceramic disc 43.

Figure 10:
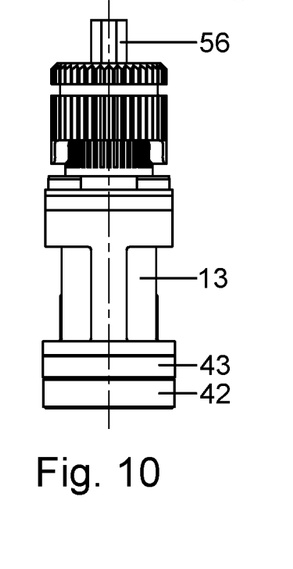
FIG. 10 shows the front view of the interior unit of the cartridge that can be turned.
Figure 11:
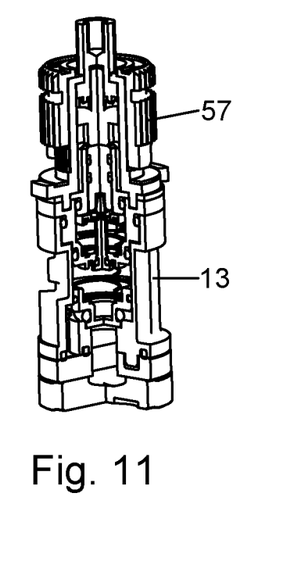
FIG. 11 is the perspective view of the interior unit shown in FIG. 10 from which a quarter part has been removed.
Figure 12:
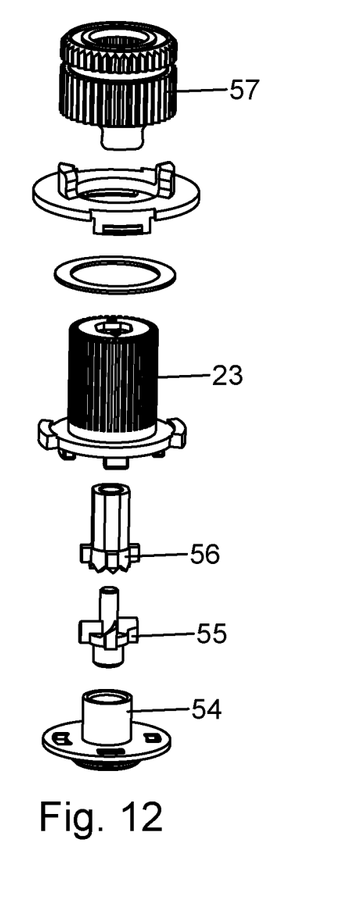
FIG. 12 is the exploded perspective view of upper part of the internal unit shown in FIG. 10.

Reference is made again to FIG. 6 and to FIGS. 10 to 12, which show the assembly arranged in the case 41 and built together with the housing 13 and can be turned around the axis 15 as a single piece. More exactly, FIG. 12 shows only the upper part of this assembly in exploded view.

The details of the assembly can be best seen in the sectional view of FIG. 6. The case 41 is closed from above by cover 52 that has an inner lower face that is connected through a sliding ring to the upper surface of the lower rim of the closing body 23. The role of the pushbutton 27 sown in FIG. 1 is provided by a shaft 53 which is guided in a sealed way in a sleeve 54 supported on the inner rim of the closing body 23. In the lower end of the shaft 53 a nest is provided to receive the upper end of the shaft 28 that moves the control valve 30. Above the shaft 53, a per se known adjusting mechanism is arranged that has two stable positions, in which an axially guided claw support 55 is arranged that can be turned around the axis and guided by a claw moving sleeve 56 arranged above and around it and which can be best observed in the exploded view of FIG. 12.

The outer mantle of the cylindrical section of the pushbutton housing that extends out of the cover 52 is provided with axial grooves onto which a sleeve 57 provided. The sleeve 57 has fitting inner axial grooves and it serves to receive the rotatable knob or handle of a fixture that receives the cartridge 40 and which is not shown in the drawing and by which the units shown in FIGS. 10 to 12 can be turned around the axis 15. The fixture has a pushbutton (not show in the drawing) by which the fluid flow can be started and stopped and this pushbutton can be positioned on the outer part of the moving sleeve 56.

Following its installation in the associated fixture, the cartridge 40 can be used by one or two handling elements. One possibility for the handling is the opening and closing the fluid flow which can be controlled by the repeated axial pushing of the moving sleeve 56. By the first pushing, the lower claws of the moving sleeve 56 turn the claw support 55 and in such a turned position it will get into abutment in pushed state, and in that case the shaft 53 will move in downward direction and pushes the shaft 28 to the same extent, whereby the control valve 30 moves to open state. The repeated pushing of the moving sleeve 56 turns the claw support 55 further and it will take the second stable position which is higher than before and the shaft 28 is moved again in the position shown in FIG. 6 and the control valve 30 gets closed. Such two positions are repeated at the subsequent pressings of the moving sleeve 56, whereby the user can open and close the fluid flow with the repeated pushing of the handling element. The other handling element of the fixture controls the angular turning of the grooved sleeve 57, whereby the housing 13 and the ceramic moving disc 43 will take the adjusted angular position with respect to the ceramic stationary disc 42. The adjustments defined by the angular position and the associated effects depend on the design of the ceramic stationary and moving discs 42, 43, of the lower passages of the case 41 and finally how the outer connections are made.

In the following examples will be shown for the preferable possibilities of the application of the solution according to the invention.

Figure 14:
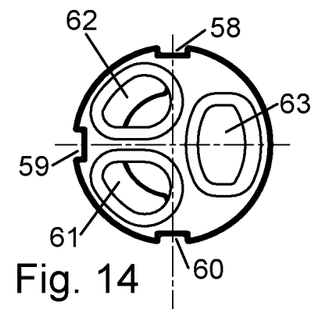
FIG. 14 is the bottom view of the ceramic stationary disc 42.
Figure 15:
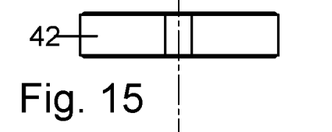
FIG. 15 is the front view of the ceramic stationary disc 42.

The first example for such an application is the mixing of cold and warm water. In that case the cartridge 40 corresponds to that shown in FIG. 6, and the design of the ceramic stationary disc 42 is shown in the bottom view of FIG. 14, in the side view of FIG. 15, in the top view of FIG. 16, and finally in the obliquely projected perspective view in FIG. 13.

Figure 13:
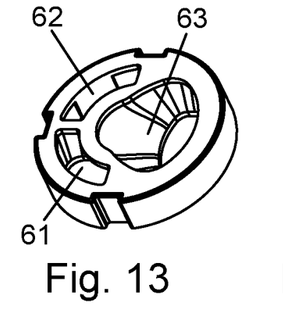
FIG. 13 is the perspective view of the ceramic stationary disc 42 showing the control surface.
Figure 16:
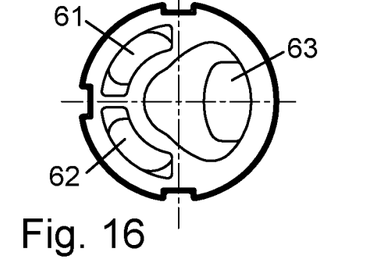
FIG. 16 is the top view of the ceramic stationary disc 42.

The ceramic stationary disc 42 has a circular shape and, at its edge, three cuts 58, 59 and 60 are provided, and at the bottom of the case 41 into which the ceramic stationary disc 42 is inserted at locations corresponding to the positions of the cuts 58 to 60 respective ribs are provided of which in FIG. 6 only one can be seen in section. The ribs inserted into the cuts 58 to 60 prevent the angular displacement of the ceramic stationary disc 42 to get turned around the axis 15. In the bottom view of FIG. 15, the outer surfaces of three openings can be seen which are made in the body of the ceramic stationary disc 42, which communicate through passages provided in the bottom of the case 41 to respective connections of the cartridge. Opening 61 is associated with and coupled to the cold water inlet, opening 62 to the warm water inlet and opening 63 to the mixed water outlet. In FIGS. 13 and 16, it can be observed that the openings 61 to 63 proceed in narrowing and widening passages and reach the common contact surface of the two ceramic discs 42, 43. The openings 61 and 62 have spaced upper surfaces in the shape of respective circular sectors, and those surfaces are reached through inclined narrowing passages, whereas the opening 63 which is associated with the outlet of the mixed water has a fairly large upper cross section that includes the extension of the axis 15.

Figure 17:
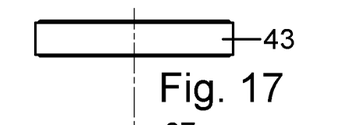
FIG. 17 is the front view of the ceramic moving disc 43.
Figure 18:
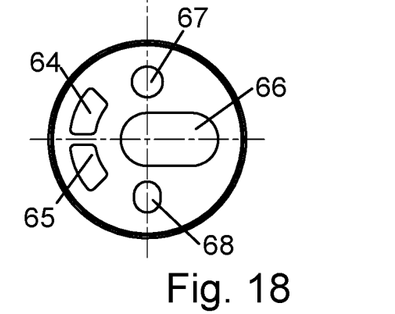
FIG. 18 is the top view of the ceramic moving disc 43.

The ceramic moving disc 43 shown in FIGS. 17 and 18 has opening 64 for furthering the flow of warm water, opening 65 for the flow of cold water and opening 66 for the flow of mixed water. The openings 64 to 66 have walls extending substantially parallel to the longitudinal axis 15. On the upper surface of the ceramic moving disc 43 in a symmetric arrangement with respect to the axis 15, a pair of bores 67, 68 is provided which have size and position that match the position and size of the two pins 50, 51 extending out from the bottom of the housing 13, whereby the angular turning of the housing 13 turns also the ceramic moving disc 43. When the ceramic moving disc 43 is pressed to the lower end of the housing 13, then the openings 64 and 66 communicate with the passage 16 (FIG. 6) and the central opening 66 is in communication with the central outlet space 49. In the extreme angular positions through the openings 64 or 65, only cold or only warm water can flow.

The above shown cartridge serves for the mixing of cold and warm water because depending on the extent how large cross sections of the openings 64 and 65 communicate with the lower end of the passage 16, the proportion of the flow of cold and warm water will change and thereby the temperature of the mixed water is determined that flows through the flow controlled piston valve 10 into the outlet space 49. This mixed water can be lead through the outlet of the cartridge, e.g. to a shower head or to a tap of a tub. The flow of the water is opened and closed by the pushbutton with two states. A characteristic of this solution lies in that the turning of the inner unit of the cartridge cannot close the water flow and the flow rate, but the temperature can be adjusted in a comfortable way.

In case out of the openings 61 and 62 only one is used as an inlet to which already mixed water is lead, then the cartridge 40 can control the flow rate of the mixed water.

Figure 19:
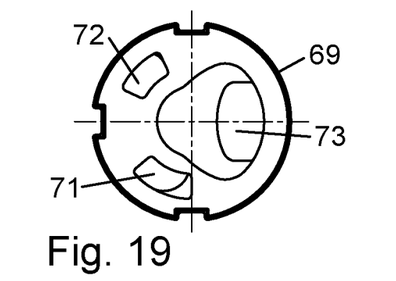
FIG. 19 is the perspective view of the ceramic stationary disc 69.
Figure 20:
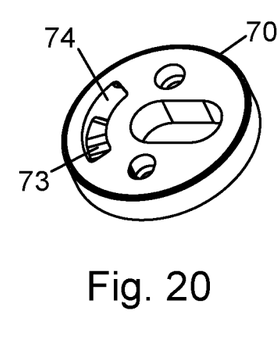
FIG. 20 is the perspective view of the ceramic stationary disc 69 projected from above.
Figure 21:
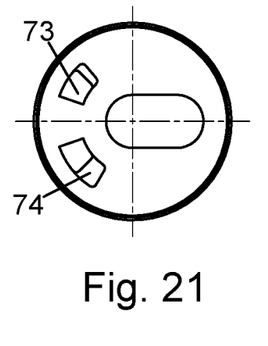
FIG. 21 is the bottom view of the ceramic stationary disc 70.

In a further embodiment of the cartridge according to the invention, the elevation cross section will not change compared to FIG. 6, i.e. the structure shown in the previous embodiment is used, but here a different ceramic stationary disc 69 and a different ceramic moving disc 70 is used, wherein FIG. 19 shows the top view in the common contact plane of the stationary disc 69 and FIGS. 20 and 21 show the ceramic moving disc 70. This cartridge is called a rotation cartridge. The difference relative to the previous embodiment lies in case of the ceramic stationary disc 69 in when comparing the views of FIGS. 16 and 19 that the arced sectors of the inlet opening 71 for the cold water and opening 72 for the inlet of warm water are somewhat narrower compared to the openings 61 and 62 with similar tasks. At the same time, the separation space between the openings 71 and 72 occupy a higher angular range. FIG. 21 shows the bottom view of the ceramic moving disc 70 and FIG. 20 shows the perspective view of the same moving disc 70 projected from above. In the common contacting plane of the stationary and moving discs 69 and 70 on the lower surface of the moving disc 70, a pair of separate openings 73, 74 are provided, and the passage of the opening 73 communicating with the cold water inlet extends in through the body of the ceramic moving disc 70 in an inclined way that approaches first the opening 74 then gets united therewith which can well be observed in the perspective view of FIG. 20.

The result of such a design lies in that the turning of the ceramic moving disc 70 adjusts the flow rate of cold water and also the mixing ratio of the two waters, i.e. the temperature of the mixed water can be adjusted.

Figure 22:
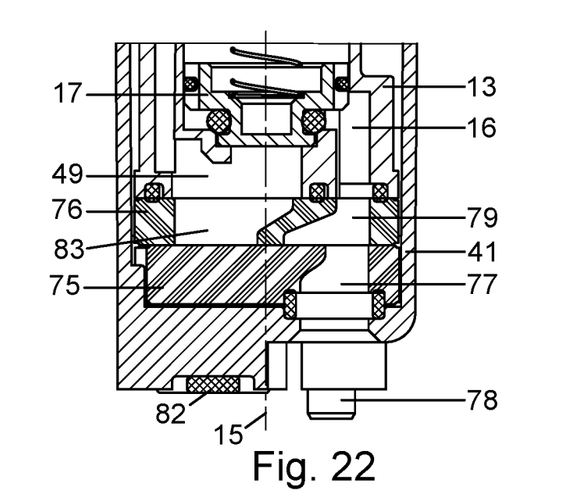
FIG. 22 is a view similar to FIG. 6 but it shows only the lower part of the cartridge.
Figure 23:
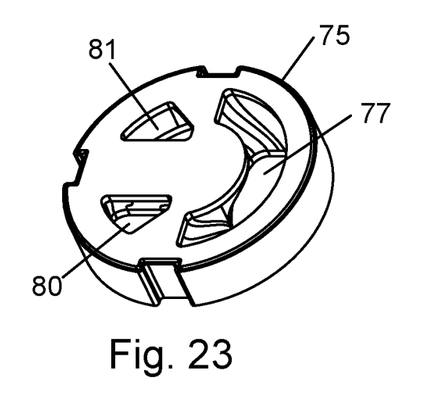
FIG. 23 is the perspective view of the ceramic stationary disc 75 showing the common displacement surface.
Figure 24:
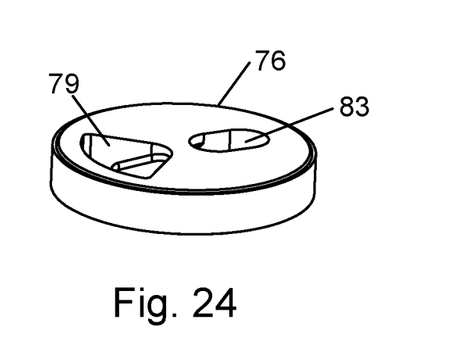
FIG. 24 is the perspective view of the ceramic moving disc 76 showing the common displacement surface.

Reference is made now to FIGS. 22 to 24, in which an embodiment of the cartridge according to the invention is shown which performs a closed diverter function. FIG. 22 is a sectional view that corresponds to the lower part of FIG. 6 that shows the portion of the cartridge 40 under the valve piston 17 and which slightly differs from the previous embodiments. In FIG. 22, the passage 16 in the housing 13 is arranged more to the right side compared to the design of FIG. 6 and the outlet space 49 under the valve piston is arranged in the central part lead to the left side. In this embodiment, a ceramic stationary disc 75 is arranged on the lower part of the case 41 and above it a ceramic moving disc 76 is placed which is moved by the housing 13 for angular displacement around the axis 15, and these discs 75, 75 are pressed to contact each other with a predetermined biasing force in a common contact plane. FIG. 23 is a perspective view of the ceramic stationary disc 75 showing its surface at said common plane, and FIG. 24 shows in a similar way the surface of the ceramic moving disc 76 in the same plane.

On the ceramic stationary disc 75, a wide opening 77 can be seen, which is limited by spaced concentric circular arcs and extends through a high angular range which is connected to the inlet 78 of the cartridge 40 to which mixed water with predetermined temperature should be connected.

The ceramic moving disc 76 has an opening 79 associated with the inlet and, as it can be seen in the sectional view of FIG. 22, has an inclined inner profile, and in each angular position of the ceramic moving disc 76 interconnects the wide opening 77 on the ceramic stationary disc 75 with the passage 16 of the cartridge 40 which is the inlet of the flow controlled piston valve 10.

In the ceramic stationary disc 75, two narrow openings 80 and 81 are provided which are arranged at angularly spaced positions from each other and both are coupled to respective outlets, of which in FIG. 22 only outlet 82 can be seen. In bathroom applications, these two outlets can be connected to a tub and to a shower head, respectively or to two separate shower heads. In the ceramic moving disc 76 in the contact plane shown in FIG. 24, a narrow rounded rectangular opening 83 is provided which has an inner profile which is diverted from the central region to lateral direction, as can be seen in FIG. 22, in order to meet with the two openings 80 and 81 on the ceramic stationary disc 75. Based on the drawings, it can be understood that during the turning of the interior of the cartridge 40, the outlet space 49 will get into communication through the opening 83 and, depending on the angular position, either with the opening 80 or 81 of the ceramic stationary disc 75. In that case, the mixed water can flow to one of the outlets connected to the two openings 80, 81, and in case the opening 83 will be just opposite to the closed space between the opening 80, 81 the water flow will be broken. It is noted that by the appropriate design of the width of the opening 83, the water flow can never get broken and, out of the two outlets, there will always be a water flow (of course only in the pen state of the flow controlled piston valve 10).

Figure 25:
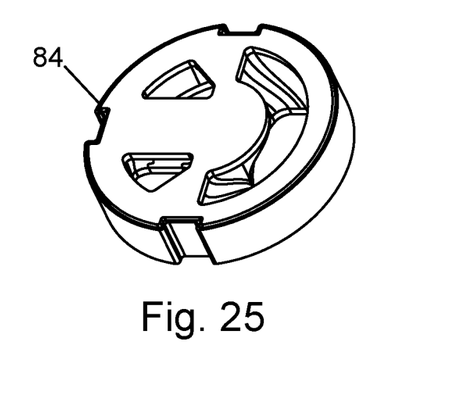
FIG. 25 is the perspective view of the ceramic stationary disc 84 showing the common displacement surface.
Figure 26:
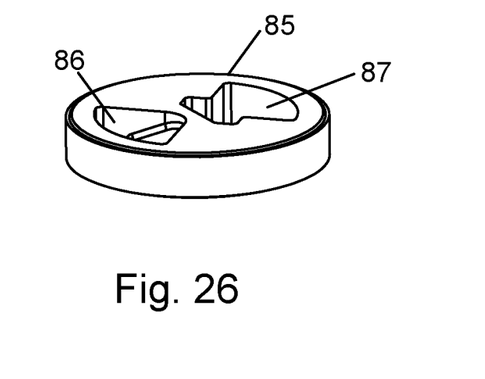
FIG. 26 is the perspective view of the ceramic moving disc 85 showing the common displacement surface.

FIGS. 25 and 26 show ceramic stationary disc 84 and ceramic moving disc 86 of a cartridge with open diverter in views corresponding to that shown in FIGS. 23 and 24, i.e. they show their surfaces in their contact plane. The cartridge itself is designed as shown in FIG. 22 and there is no change with respect to the previous embodiment. The ceramic stationary disc 84 of the cartridge with open diverter has substantially the same design as that of the stationary disc 75 of the cartridge with closed diverter and shown in FIG. 23. In case of the ceramic moving disc 85, however, only opening 86 associated with the inlet of mixed water is identical or similar with the opening 79 of the previous embodiment and opening 87 associated with the outlet is much wider compared to the opening 83, and it has an outer part in which the outer edge forming a circular arc has two ends that are continued in respective straight inwardly directed section than following the center of the opening they will become diverging again.

This design ensures that, during the turning of the cartridge in the two extreme angular positions, the mixed water is lead to one or the other outlet but in the central angular position both outlet branches are active. By turning, the flow rate can also be changed. This embodiment does not have any closed position.

In the aforementioned embodiments it has been demonstrated that the cartridge according to the invention has multiple ways of use by changing the design of the two ceramic discs and of the lower part of the cartridge, and based on these principles further not described functions can be realized, e.g. cartridge with more than two outlet with closed or open diverter functions. It is important to note that the described advantages coming from the application of the flow controlled piston valve 10 will be present at all such embodiments.

The invention claimed is:

1. A cartridge for mixing and/or directing water, comprising:
a piston valve (10) closing and opening fluid flow between at least one inlet and at least one outlet, in which a control valve (30) is arranged within the piston valve and operated by a double position mechanism by which the control valve (30) can be set into open and closed positions by the subsequent pressings of a pushbutton (27),
wherein the control valve (30), the valve and the double position mechanism constitute a common mechanical unit all having a common axis (15), and the double position mechanism, the control valve (30) and the valve are arranged along the common axis (15) after one another in a housing (13), and the housing (13) is surrounded in a sealed way by a case (41) in which the housing (13) can be turned around the axis (15) within a predetermined angular range, and in the interior of the case (41) under the lower end of the housing (13) a ceramic stationary disc (42, 69, 75, 84) is arranged, and directly above the ceramic stationary disc (42, 69, 75, 84) with a common contacting plane a ceramic moving disc (43, 70, 76, 85) is arranged which can be turned together with the housing (13), and said at least one inlet and said at least one outlet are both arranged at a bottom of the case (41) and leading to the ceramic stationary disc (42, 69, 75, 84),
wherein said piston valve is flow controlled and has a valve piston (17) guided in an interior of the housing (13) for axial displacement, and a bottom of the piston valve (10) comprises a valve seat (14) belonging to the housing (13),
wherein the control valve (30) and the valve piston (17) are not directly mechanically connected,
wherein said at least one inlet is lead through an inlet opening of the ceramic stationary disc (42, 69, 75, 84) and the ceramic moving disc (43, 70, 76, 85) and through a vertical lateral passage (16) completely provided in the interior of the housing (13) to an intermediate space (34) arranged in a closed state of the valve piston (17) between a top of the valve piston (17) and a bottom of the control valve (30), and
wherein an interior space (12) of the housing (13) located under the valve seat (14) of the valve piston (17) is separated from said lateral passage (16) and constitutes an outlet space (49) communicating through said ceramic moving disc and said ceramic stationary disc to said at least one outlet, and the outlet space (49) is connected through a further passage (31) with an upper space (32) defined directly between the control valve (30) and said double position mechanism, and both said inlet opening and an outlet opening provided in the ceramic stationary disc and the ceramic moving disc (42, 69, 75, 84) and (43, 70, 76, 85) are arranged offset around the common axis, such that they are not coaxial with the common axis (15).

2. The cartridge of claim 1, wherein the ceramic stationary disc (42, 69, 75, 84) comprises cuts (58, 59, 60) and the case (41) has respective ribs at positions corresponding the said cuts (58, 59, 6) which are inserted into said cuts (58, 59, 60) to prevent angular displacement of the ceramic stationary disc (42, 69, 75, 84) relative to the case (41).

3. The cartridge of claim 1, wherein said ceramic moving disc (43, 70, 76, 85) has a circular shape and has a surface facing the housing (13) in which bores (67, 68) are arranged away from the common axis (15) and from each other, and from the bottom of the housing (13) at positions that correspond to said bores (67, 68) pins (50, 51) extend outwardly and are inserted into said bores (67, 68), whereby the ceramic moving disc (43, 70, 76, 85) follows turning of the housing (13) around the axis (15).

4. The cartridge of claim 1 for the mixing cold water and warm water, wherein in a half of the ceramic stationary disc (42) separated by a diagonal when seen from a bottom of the cartridge two openings (61, 62) are provided, the two openings used for the at least one inlet and a shape of the two openings (61, 62) change in the interior of the ceramic stationary disc (42), wherein the shape in said contacting plane corresponds to two spaced circular sectors defined by a pair of circular arc sections, and the ceramic moving disc (43) further comprises in said common plane a pair of openings (64, 65) having a shape of circular arc sections and separated by a smaller spacing and covering respective narrower angular ranges than said two openings (61, 62) in the stationary disc (42), wherein openings 61 and 65 are associated with the cold water, openings 62 and 64 are associated with warm water, and in the ceramic stationary disc (42) in the half circular area positioned opposite to the openings (61, 62) a further opening (63) is provided that has a bottom surface with substantially rectangular shape with rounded ends which expands along inclined walls in a body of the ceramic stationary disc (42) towards the common plane, and in said plane the opening (63) has a shape that surrounds the common axis (15) and sides that diverge in a radial direction to form substantially a triangle with rounded ends, and opposite to this opening (63) in the ceramic moving disc (43) a rectangular opening (66) is provided with rounded ends and which surrounds the common axis (15) and extends in radial outward direction and communicates with said outlet space (49), and a bottom of said opening (63) of the ceramic stationary disc (42) communicates with said at least one outlet.

5. The cartridge of claim 4, wherein in the ceramic moving disc (43), one opening (64) of the pair of openings is closed, and mixed water with a required temperature is lead to the at least one inlet opposite to another opening of the pair of openings, and flow rate of water can be adjusted by turning of the housing (13).

6. The cartridge of claim 4 for the mixing of cold and warm water, wherein one opening (73) of the ceramic moving disc (70) in said plane proceeds within a body of the ceramic moving disc (70) in an inclined path towards another opening (74) and gets united therewith before reaching an upper plane, whereby in addition to changing a mixing ratio of the cold and warm water the flow rate of water passed through the opening (73) with inclined passage can also be adjusted.

7. The cartridge of claim 1 for performing diverting function, wherein in an opposite side of the ceramic stationary disc (75) relative to said common plane an opening (77) is provided in a radial direction away from the common axis (15) which occupies a wide angular arc sector, and the opening (77) gets narrower in a body of the ceramic stationary disc (75) and leads to an axial extension line of said vertical lateral passage (16), the ceramic moving disc (76) has an opening (79) in said common plane that has a shape which starts from a central part and opens as a widening arc section in radial direction away from a center which partially covers said opening (77) of the ceramic stationary disc (75) within a turning range of the ceramic moving disc (76), and the ceramic stationary disc (75) comprises at the side opposite to said opening (77) further angularly spaced openings (80, 81) which lie away from the common axis (15) in the same extent, and respective outlets of the at least one outlet are connected to opposite ends of the angularly spaced openings (80, 81), and in the ceramic moving disc (76) in opposite position to said opening (77) in said common plane a rectangular, rounded opening (83) is provided extending from the center in radial direction and within a body of the moving disc (76) the opening proceeds as an inclined passage to the outlet space (49) of the flow controlled piston valve (10), and during turning of the ceramic moving disc (76) the water passed to the inlet will alternatively and separately flow to the respective outlets.

8. The cartridge of claim 1 for performing open diverting function, wherein in an opposite side of the ceramic stationary disc (84) relative to said common plane a wide opening is provided in a radial direction away from the common axis (15) which occupies a wide angular arc sector, and the wide opening gets narrower in a body of the ceramic stationary disc (84) and leads to an axial extension line of said vertical lateral passage (16), the ceramic moving disc (85) has an opening (86) in said common plane that has a shape which starts from a central part and opens as a widening arc section in the radial direction away from a center which partially covers a wide opening of the ceramic stationary disc (84) within a turning range of the ceramic moving disc (85), and the ceramic stationary disc (84) comprises at the side opposite to said wide opening further angularly spaced openings which lie away from the common axis (15) in the same extent, and respective outlets of the at least one outlet are connected to opposite ends of these spaced openings, and in the ceramic moving disc (85) in opposite position to said wide opening in said common plane an opening (87) is provided that extends from the center outwardly in the radial direction and a shape of the opening (87) is first wide and then narrows until reaching about a half radial length then widens again in an outward direction and being rounded at both ends, and the opening (87) proceeds to communicate with the outlet space (49) of the flow controlled piston valve (10), and during turning of the ceramic moving disc (85) the water is passed to the at least one inlet will alternatively flow to the respective outlets and in a central angular range to both of said outlets.

\* \* \* \* \*